United States Patent [19]

Robinson

[11] 4,408,948
[45] Oct. 11, 1983

[54] CONTROLLED-FOLDING AND CONTROLLED-UNFOLDING MULTIPLE SECTION PLATFORM ASSEMBLY

[76] Inventor: Morris D. Robinson, 179 Via Los Mira Dores, Redondo Beach, Calif. 90277

[21] Appl. No.: 3,988

[22] Filed: Jan. 16, 1979

[51] Int. Cl.³ ............................................. B60P 1/44
[52] U.S. Cl. .................................... 414/545; 187/9 R
[58] Field of Search ....................... 414/540, 545, 557; 187/9 R

[56] References Cited

U.S. PATENT DOCUMENTS

| | | | |
|---|---|---|---|
| 2,405,054 | 7/1946 | Pringle | 414/545 |
| 2,530,341 | 11/1950 | Satsky | 414/545 |
| 3,275,170 | 9/1966 | MacRae et al. | 414/545 |
| 3,791,541 | 2/1974 | Himes | 414/545 |
| 3,795,329 | 3/1974 | Martin et al. | 414/545 |
| 3,800,915 | 4/1974 | Himes | 414/545 X |
| 3,831,788 | 8/1974 | Erlinder | 414/545 |
| 3,968,890 | 7/1976 | Robson | 414/545 X |
| 4,007,844 | 2/1977 | Perkins | 414/557 X |

FOREIGN PATENT DOCUMENTS

| | | | |
|---|---|---|---|
| 1395365 | 3/1965 | France | 414/545 |
| 1313514 | 4/1973 | United Kingdom | 414/545 |

*Primary Examiner*—Leslie J. Paperner
*Attorney, Agent, or Firm*—Donald D. Mon

[57] ABSTRACT

A controlled-folding and controlled-unfolding multiple section platform assembly for a structural entry. A platform assembly includes an inner and an outer platform section which are pivotally joined together for folding and unfolding. Fold control means comprises a pair of pivotally jointed rigid supports and a rigid co-ordinating member extending between the inner platform section and the outermost of the rigid supports. Tilting of the inner platform section is accompanied by a folding action of the outer platform section, there being a unique included angle between the two platform sections for every unique angle of tilt of the inner platform section.

14 Claims, 7 Drawing Figures

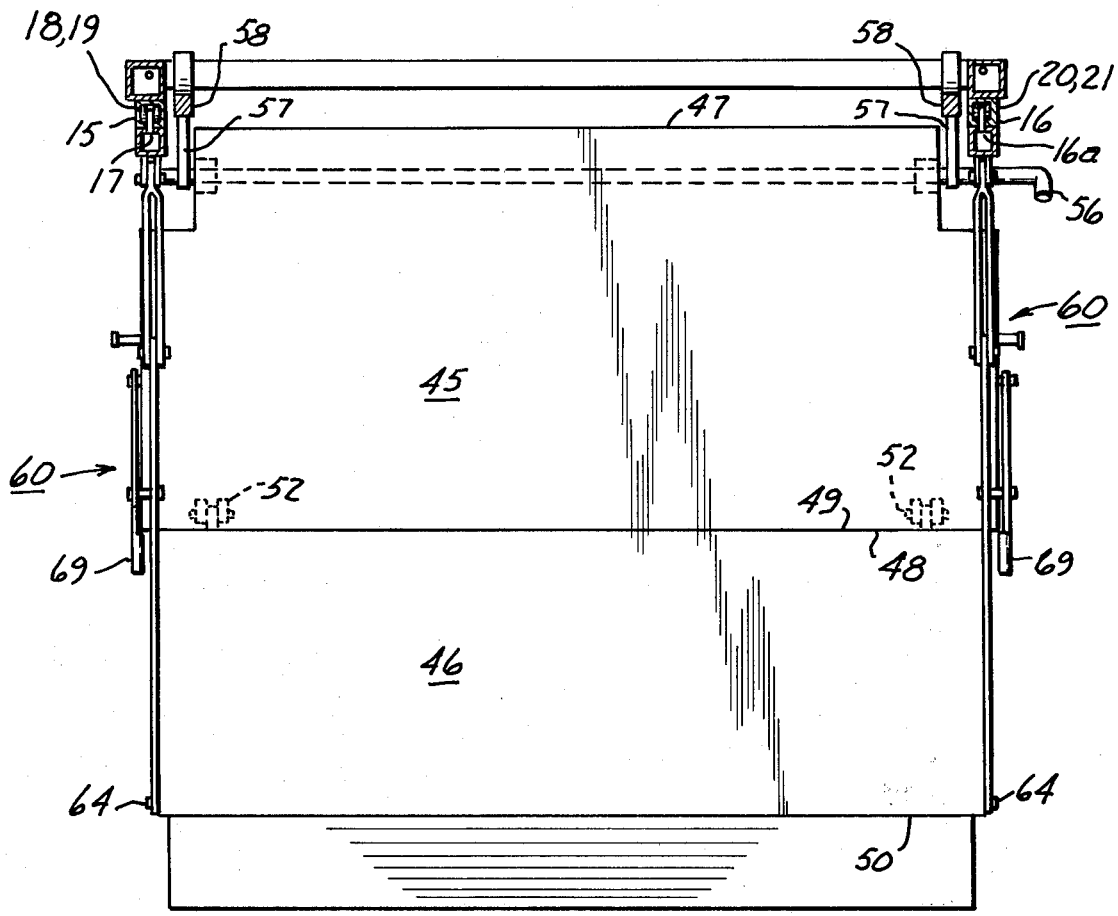

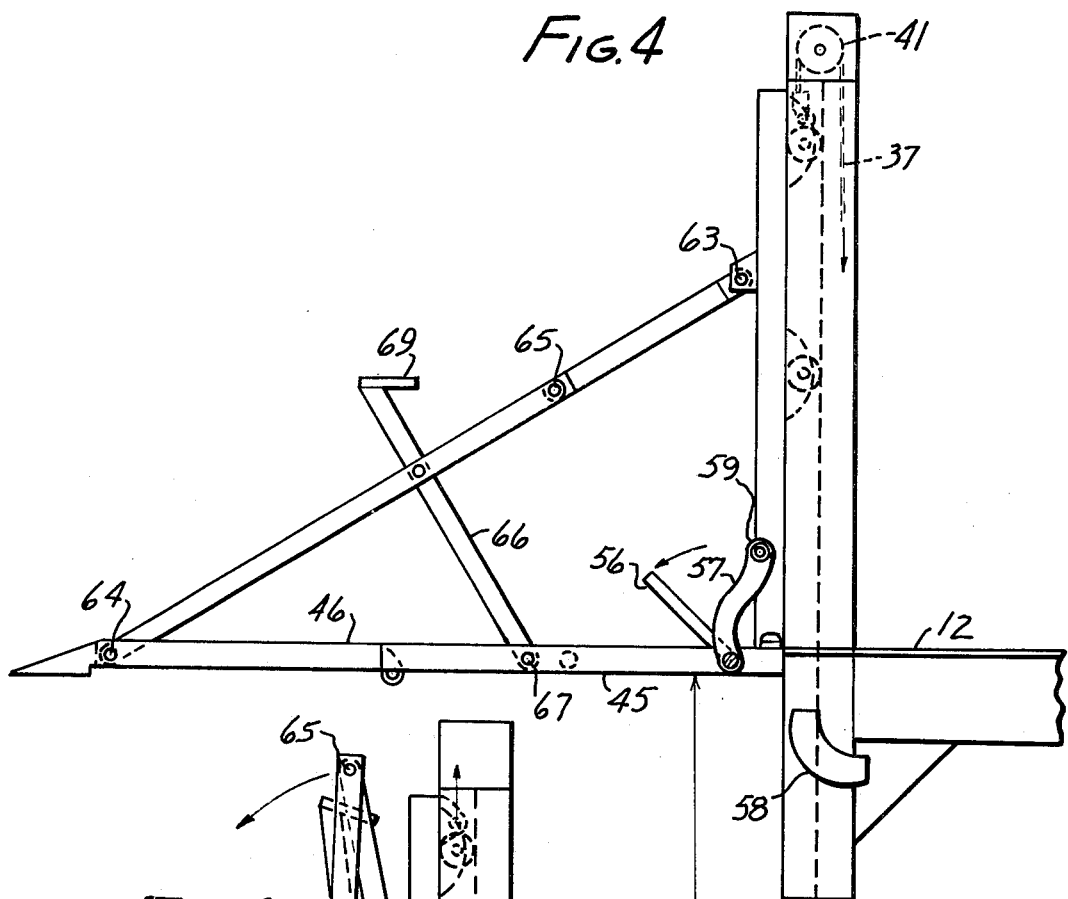
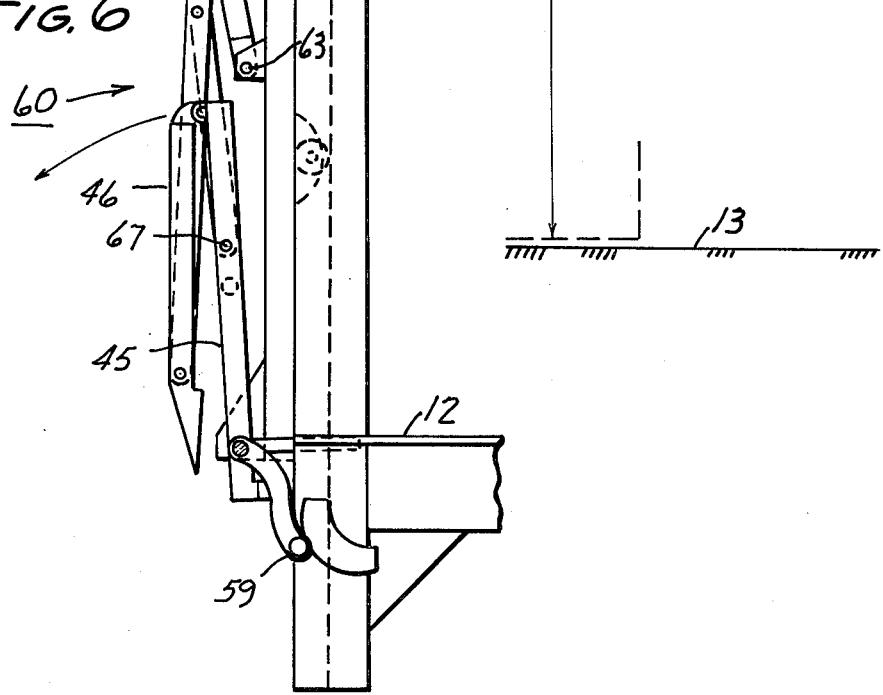

CONTROLLED-FOLDING AND CONTROLLED-UNFOLDING MULTIPLE SECTION PLATFORM ASSEMBLY

FIELD OF THE INVENTION

This invention relates to platform assemblies for structural entries such as the rear gates of trucks and of loading platforms.

BACKGROUND OF THE INVENTION

Foldable multiple section platform assemblies for structural entries such as the rear of trucks are well-known. Their purpose is to decrease the platform area when not in use. Known examples of the type wherein hinge between an inner and outer platform section rises and the outer section folds against the inner section on the outer side are Erlinder U.S. Pat. Nos. 3,831,788, and Perkins 4,007,844. This invention relates to a platform which folds in this pattern.

A disadvantage of this type of platform assembly is that, while the platform is structurally reliable when unfolded and horizontal, its predictability decreases when being folded or unfolded, and when the platform is in its stored condition. In its stored condition the outer platform section, unless properly hooked, can dangle and assume a wide variety of positions. This can constitute a potential risk.

Furthermore, in the transition between the folded and unfolded positions, it has been customary to use chains which do not give positive control and which are subject to slippage. These constitute risks of malfunction.

It is an object of this invention to provide a controlled-folding and controlled-unfolding multiple section platform assembly wherein the angle between the two platform sections is a unique function of the position of the inner platform section by providing fold control means for this purpose.

It is another object of this invention to provide a controlled-folding and controlled-unfolding multiple section platform assembly wherein the angle between the two platform sections is a unique function of the position of the inner platform section by providing fold control means for this purpose.

It is another object of this invention to provide fold control means by eliminating flexible members, using only rigid members which are pivotally joined to one another so as to provide for rigidity of the system at all of its operating positions and for said uniqueness of position of the platform sections relative to one another and to the structure to which it is attached.

It will also be noted that, in prior art devices which utilize flexible chains, if the platform is lowered onto an obstruction such as a curb or a rock it has unlimited tilt and can dump objects which may be on the platform. It is an object of this invention to provide a platform which will have limited tilt relative to its mounting when it is lowered onto an obstruction, and this is due to the general rigidity and positive control of the system.

A platform assembly according to this invention utilizes an inner platform section and an outer platform section which are joined together, the inner platform section being hingeable to structure associated with a structural entry. Fold control means comprises a pair of rigid support members which are hinged together, and a rigid co-ordinating member which extends between the inner platform section and the outermost one of the rigid support member. As a consequence of the correct proportioning of the element of this device, when the inner platform section is tilted the outer platform section will assume a unique angular position relative to it for each one of the angular positions of the inner platform sections.

According to a preferred but optional feature of the invention, the platform assembly includes a substantially vertical track, and a carriage restrained to the track for movement along the track whereby the platform sections can be raised and lowered.

According to still another preferred but optional feature of the invention, angle control means is selectively engageable and disengageable to the structure and is engaged to the inner platform section whereby selectively to tilt the inner platform section when it is desired to fold the platform assembly.

The above and other features of this invention will be fully understood from the following detailed description and the accompanying drawings in which:

FIG. 3 is a top view taken at line 3—3 in FIG. 2;

FIG. 4 is a fragmentary side-view showing the device in two of its operating configurations;

FIG. 5 is a fragmentary side-view showing the device in a transition configuration;

FIG. 6 is a side-view showing the device in its folded configuration; and

FIG. 7 is a fragmentary side-view showing an alternate embodiment of the invention.

Figure 1:
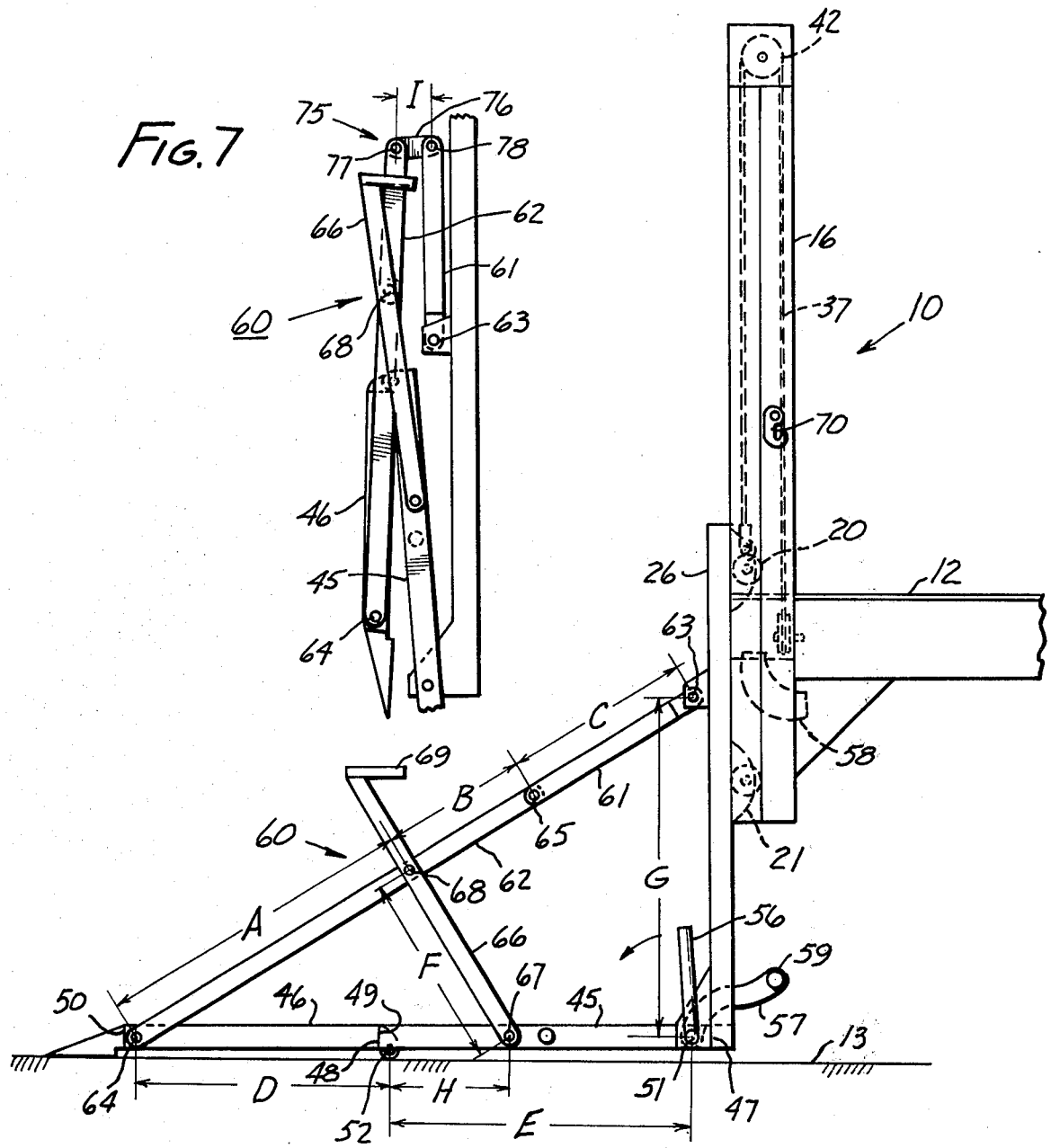
FIG. 1 is a side elevation of the presently preferred embodiment of the invention.

The presently preferred embodiment of a controlled-folding and controlled-unfolding multiple section platform assembly 10 is shown in FIGS. 1-6. It is intended for use at a structural entry 11 which might be the rear entry of a truck whose truck bed 12 is shown in FIG. 1 supported by wheels (not shown) above the ground 13. Classically, this structural entry will have horizontal and vertical structural members. In addition to use with mobile entries and mobile structures, this invention can be used with stationary structures such as loading docks and the like. It is an object of this invention to provide a platform which can be folded and unfolded, and if desired also raised and lowered. The adjacent structure can be arbitarily selected.

Figure 2:
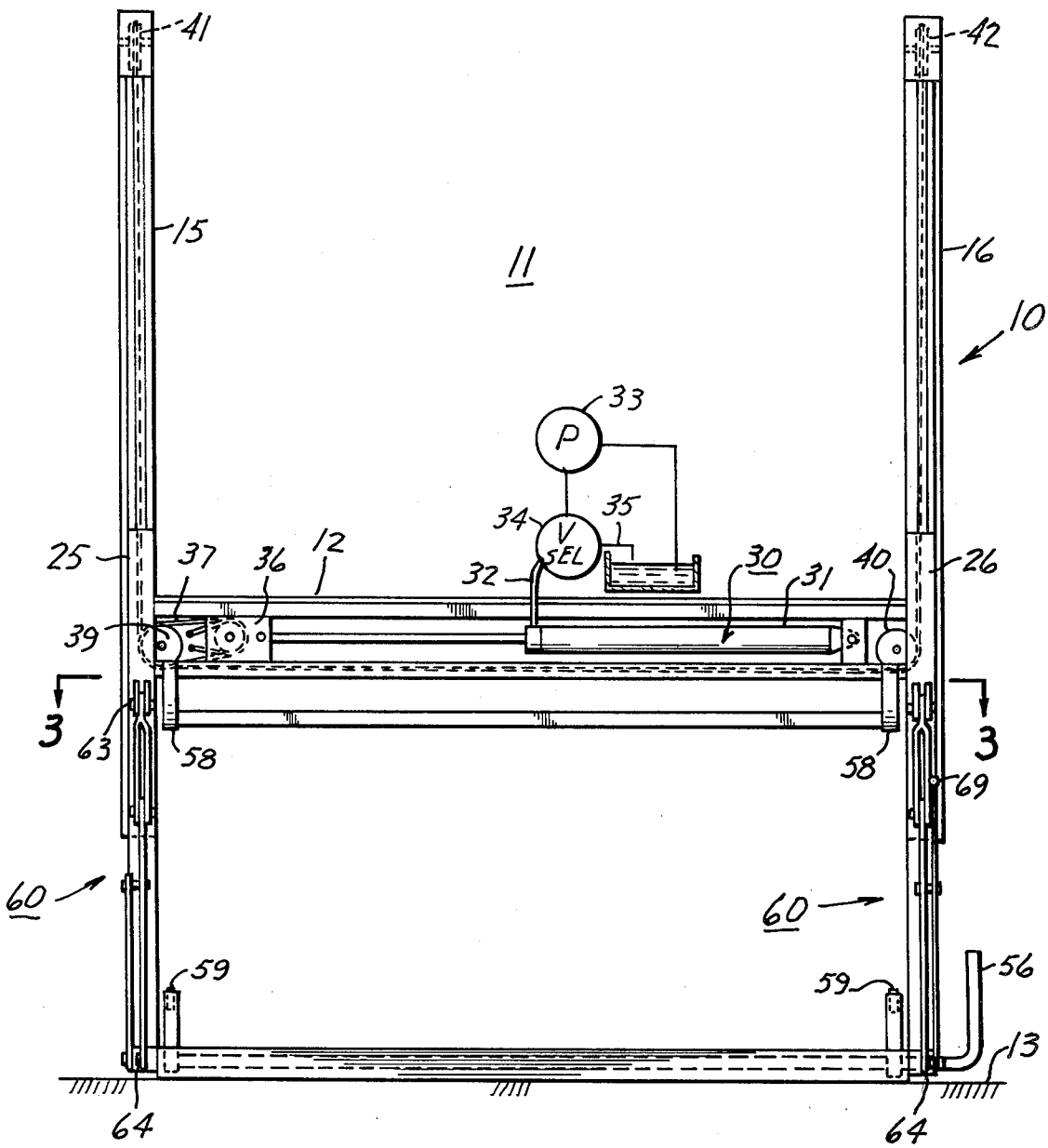
FIG. 2 is a left-hand view in FIG. 1.

As best shown in FIGS. 1 and 2, the structure includes a pair of vertical tracks 15, 16 one on each side of the entry and extending both above and below the level of the bed 12. The tracks have flanges 16, 17 which can be engaged on their reverse sides by rollers 18, 19, 20, 21 which are mounted to carriages 25 and 26. The carriages are therefore slidable up and down the tracks. This up and down movement is caused by power means 30.

The power means includes a hydraulic piston-rod cylinder assembly 31 with a hydraulic line 32 connected to a source of fluid under pressure such as a pump 33 through a selector valve 34. The selector valve can direct fluid under pressure to the line, or can connect the line to a vent 35 as desired. The cylinder is anchored to the truck bed. A slider block 36 is pinned to the piston-rod of the assembly and slides horizontally in the bed. A cable assembly multiples the distance moved by the carriage relative to the slider block movement in order that the piston-cylinder assembly can fit into the relatively narrow width of the truck body and still move the platform a considerable vertical distance. The cable assembly is provided in duplicate, one set on each side of the platform, and passes under sheaths 39, 40 and up over sheaths 41, 42 at the top of tracks 15, 16 and then downwardly where their ends connect to carriages 25 and 26 respectively.

When the slider block moves to the right in FIG. 2 the carriages will be raised. This is accomplished by injecting fluid under pressure into the left hand side of the piston in the cylinder in FIG. 2. To lower the assembly the selector valve is set to vent, and the platform assembly will move down under its own weight to restore the piston to the position shown in FIG. 2.

The platform assembly includes an inner platform section 45 and an outer platform section 46. The terms "inner" and "outer" as used herein respectively refer to positions closer to and farther away from the track.

The inner platform section has an inner edge 47 and an outer edge 48. The outer platform section has an inner edge 49 and an outer edge 50. The inner platform section is pivotally mounted to the carriage by inner hinge means 51. It will be understood that a similar construction will be provided at both sides of the platform. Therefore only the side illustrated in FIG. 1 will be described in detail from this point forward, it being recognized that a similar arrangement is provided at the other side.

The platform sections are jointed to each other by outer hinge means 52. The outer hinge means is disposed beneath the two sections so that when the sections are folded out, their adjacent edges abut one another. This prevents the collapse of the sections at these hinge means and maintain the sections in the relative horizontal position shown in FIG. 1.

Angle control means is provided with a handle 56 for controlling the position of a lever 57. The structure carries a cam 58 which is engageable by a follower 59 on the end of the lever. As will later be seen, when the cam and cam follower can make contact with one another, the effect will be to tilt the inner platform section upwardly during part of its upward movement.

Fold control means 60 is provided for arranging unique angulation between the two platform sections. The fold control means includes a first rigid support member 61 and a second rigid support member 62. The first rigid support member is hinge-mounted to the carriage by first support hinge means 63. The second rigid support hinge means 62 is hinged to the outer platform section by second support hinge means 64. The two support members are hinged together by third support hinge means 65.

The fold control means further includes a rigid co-ordinating member 66 which is pivotally joined to the inner platform section by first co-ordinating hinge means 67 disposed between the inner and outer hinge means and spaced from each of them. It is joined to the second rigid support member by second co-ordinating hinge means 68. The support members and the co-ordinating member are generally elongated and are rod-like. By the term "rod-like" is meant an elongated relatively thin construction which may be flat as shown, or even by pipe-like as preferred, and which tends to remain rigid and undeformed when tension forces on it are released.

If desired, the rigid co-ordinating member can be extended to form a handle 69 to be held by a person riding the platform to steady himself.

A hook 70 can optionally be provided to make engagement with some portion of the platform assembly to hold it tightly when folded, although this is not necessary to the invention.

FIG. 7 shows an optional modification of the construction of FIG. 1. In the embodiment of FIG. 1, when the device is in its most-folded condition there may still be a somewhat larger angle between the platform sections than some people desire, and there will also have been a scissoring action between the first and second rigid support arms.

These situations are rectified in FIG. 7 by providing the third support hinge means 75 as a compound hinge instead of as a single point hinge. This is accomplished by providing a hinge plate 76 with two hinge pivots 77, 78. Then when the device is folded as shown in FIG. 7 there can be some cocking around the two centers of hinge 75 which eliminates scissoring movement between the first and second rigid support arms and which permits somewhat more parallelism of the two platform sections when the assembly is folded. Apart from this, the constructions are the same. A suitable set of dimensions, in inches, for the device is as follows with reference to FIG. 1.

| A: | 38 | F: | 22¾ |
|---|---|---|---|
| B: | 17⅝ | G: | 40 |
| C: | 21¾ | H: | 14¼ |
| D: | 30 | I: | 3 |
| E: | 36½ | | |

The device operates in the following manner. FIGS. 1 and 2 show the device in its extended, generally horizontal configuration with the platform sections aligned with one another and in the same plane. In this condition the two sections abut and mutually support each other at the inner and outer end of the edges of the inner and outer platform sections. They cannot fold downwardly any farther. The rigid support means are aligned with one another and form a tension device holding the outer end of the assembled extended platform in the illustrated position. In this condition, the co-ordinating member performs no function.

Now, if the device is to be raised to the position of FIG. 4 without unfolding, the handle is turned so that the lever and cam follower are in the FIG. 4 position, and fluid under pressure is introduced into the cylinder. Then the slider block moves to the right in FIG. 2, causing the cable to pull the platform upwardly. The lever has no effect on the configuration of the platform, because the cam follower misses the cam. The platform can be raised to the level of the bed. To lower the platform, the selector valve is set to vent the cylinder, and the weight of the platform plus whatever is on it will cause the platform to descend at a rate limited by the restriction of the fluid conduity and controls.

Next, if the device is to be folded, the handle is placed in the position shown in FIG. 1 while the platform is at a lower elevation. The platform is raised, and with this handle setting the cam follower will engage the cam track. Because it bears against the inner platform this abuttment will cause the inner platform to rotate clockwise in FIG. 1, thereby beginning its folding action.

As this occurs, the co-ordinating member exerts an upward and outward force on the second rigid support member, cocking the two support members at the third support hinge means. This motion continues, with the arcuate movements of the support members and the co-ordinating member being completely co-ordinated with the relative angular position of the two platform sections. There is a unique included dihedral angle between the platform sections for every angle of the inner platform section relative to the horizontal. The terms "horizontal and "vertical" as used herein refer to the track and truck bed when in their normal nearly vertical and level operating positions. It does not necessarily connote or require a true vertical or level condition. In fact, one of the advantages of this invention is that the truck can be on a rather steep shoulder, and still the platform will retain its specific relationship to the tracks without substantial tilting or cocking. Certainly there will be no release of chains, because there are none to release. Furthermore, the unfolded platform can be lowered onto an abstacle without much cocking or tilting. This device is a substantially rigid system which permits no undesireable amount of flexibility of movement between the inner and outer platform sections. Their positions are always uniquely relatively located to one another. Also, they are always uniquely oriented relative to the tracks.

When the variation of FIG. 7 is used, its function is precisely the same as that just described, except that as the platform sections approach parallelism with one another, there will be a cocking action at hinge 75 instead of a scissor action. Also, the sections can nest a trifle closer together.

The progression from unfolded to folded condition will be seen by considering FIGS. 4, 5 and 6 in sequence, and will be evident to persons skilled in the art.

The handle provided on the co-ordinating member extension is available to the user the device to steady him when he rides the platform up and down. Cam 58 can be faired into the track, or continued as a separate track in order to cause the follower to maintain the folded position if desired.

This invention is not to be limited by the embodiments shown in the drawings and described in the description, which are given by way of example and not of limitation, but only in accordance with the scope of the appended claims.

I claim:

1. A controlled-folding and controlled-unfolding multiple-section platform assembly for a structural entry, said platform assembly comprising:

an inner platform section having an inner edge and an outer edge;

inner hinge means at said inner edge pivotally mounting said inner platform section for rotation around its inner edges, said inner hinge means being adapted to be mounted to structure associated with said entry;

an outer platform section having an inner edge and an outer edge;

outer hinge means pivotally joining the inner edge of the outer platform section to the outer edge of the inner platform section; and fold control means comprising a first and a second rigid support member; first, second and third support hinge means, said first support member being adapted to be hinged to said structure at a hinge point above and substantially spaced from, said inner hinge means by said first support hinge means, said second support member being hinged to said outer platform section by said second support hinge means at a hinge point substantially spaced from the inner edge thereof, said first and second support members being hinged together by said third support hinge means at a location substantially spaced from the first and second support hinge means, a rigid co-ordinating member, and a first and a second co-ordinating hinge means, said first co-ordinating hinge means pivotally joining the co-ordinating member to the inner platform section at a first hinge point between and spaced from the inner and outer edges of said inner platform section, and said second co-ordinating hinge means pivotally joining the co-ordinating member to the second support member between and spaced from its respective hinge points;

whereby, when said inner platform section is substantially horizontal, said outer platform section is also substantially horizontal, the support members are aligned and support said outer platform section, and, when said inner platform is pivoted upwardly said fold control means causes the support members to fold toward one another and defines the angle of the other platform section relative to the inner platform section, said platform sections being substantially parallel to one another when the inner platform section is substantially vertical.

2. A platform assembly according to claim 1 in which said structure includes a substantially vertical track and a carriage restrained to said track for movement along said track, said inner hinge means, whereby said platform sections can be raised and lowered.

3. A platform assembly according to claim 2 in which angle control means is provided for rotating the inner platform section around the inner hinge means.

4. A platform assembly according to claim 3 in which said angle control means is selectively engageable and disengageable to said structure, and engaged to said inner platform section, whereby when engaged to said structure and the carriage is raised, the inner platform section is tilted upwardly and the platform assembly is folded.

5. A platform assembly according to claim 4 in which said angle control means comprises a pivoted cam follower which is manually moveable to said engaged and disengaged positions.

6. A platform assembly according to claim 1 in which said support means and said co-ordinating member are elongated and rod-like.

7. A platform assembly according to claim 1 in which said fold control means is duplicated at both sides of the platform sections.

8. A platform assembly according to claim 1 in which the spacings between the various adjacent neighboring hinge means are so proportioned, and the hinge means so arranged, that the folding and unfolding operations of the platform assembly proceed smoothly, and without binding, and in which there is a unique included angle between the platform sections for each angle of the inner platform section relative to the horizontal.

9. A platform assembly according to claim 2 in which power mean is provided to raise said carriage, and to permit said carriage to lower.

10. A platform assembly according to claim 9 in which said power means includes a cable linkage.

11. A platform assembly according to claim 1 in which said co-ordinating member extends beyond said second co-ordinating hinge means to provide a handle for a person riding the platform assembly.

12. A platform assembly according to claim 4 in which said support means and said co-ordinating member are elongated and rod-like.

13. A platform assembly according to claim 12 in which the spacing between the various adjacent neighboring hinge means are so proportioned, and the hinge means so arranged, that the folding and unfolding operations of the platform assembly proceed smoothly and without binding and in which there is a unique included angle between the platform section for each angle of the inner platform section relative to the horizontal.

14. A platform assembly according to claim 13 in which power means is provided to raise said carriage, and to permit said carriage to lower.

* * * * *